United States Patent [19]

Deckard et al.

[11] Patent Number: 5,155,324
[45] Date of Patent: Oct. 13, 1992

[54] METHOD FOR SELECTIVE LASER SINTERING WITH LAYERWISE CROSS-SCANNING

[76] Inventors: Carl R. Deckard, 1801 Pin Oak La., Round Rock, Tex. 78681; Joseph J. Beaman, 700 Texas Ave., Austin, Tex. 78705; James F. Darrah, 4906 Manchaca, Austin, Tex. 78745

[21] Appl. No.: 611,025

[22] Filed: Nov. 9, 1990

Related U.S. Application Data

[63] Continuation-in-part of Ser. No. 545,142, Jun. 22, 1990, which is a continuation of Ser. No. 105,316, Oct. 5, 1987, which is a continuation-in-part of Ser. No. 920,580, Oct. 17, 1986, Pat. No. 4,863,538.

[51] Int. Cl.⁵ .............................................. B23K 26/00
[52] U.S. Cl. .................................................. 219/121.64
[58] Field of Search ...................... 219/121.63, 121.64, 219/121.6, 121.85, 121.65, 121.66, 121.8, 121.82

[56] References Cited

U.S. PATENT DOCUMENTS

| | | | |
|---|---|---|---|
| 3,848,104 | 11/1974 | Locke | 219/121.65 |
| 4,587,396 | 5/1986 | Rubin | 219/121.73 |
| 4,818,562 | 4/1989 | Arcella et al. | 427/53.1 |
| 4,863,538 | 9/1989 | Deckard | 156/62.2 |
| 4,938,816 | 7/1990 | Beaman et al. | 156/62.2 |
| 4,944,817 | 7/1990 | Bourell et al. | 156/62.2 |
| 5,017,317 | 5/1991 | Marcus | 219/121.12 X |
| 5,017,753 | 5/1991 | Deckard | 219/121.63 |

FOREIGN PATENT DOCUMENTS 8802677  4/1988  PCT Int'l Appl.

OTHER PUBLICATIONS

Deckard, "Selective Laser Sintering," Doctoral Thesis (University of Texas, Dec. 1988).
Deckard, "Part Generation By Layerwise Selective Sintering" (University of Texas, May 1986).

*Primary Examiner*—C. L. Albritton
*Attorney, Agent, or Firm*—Vinson & Elkins

[57] ABSTRACT

An apparatus and method for producing parts by selective laser sintering are disclosed. The disclosed method selectively sinters a first layer of heat-fusible powder by directing a laser beam so that it scans the first layer in a first direction to sinter a first cross-section of the part. A second layer of the heat-fusible powder is then disposed over the first layer, and the next cross-section of the part is selectively sintered by the laser being scanned in a different direction from the first direction, for example in a direction perpendicular to the first direction. The cross-scanning resulting from scanning in different directions provides parts with structural strength which is not dependent upon orientation, with more uniform surfaces and textures, and with reduced distortion. In addition, each of the layers may have its outlined traced prior to the scanning, to further define the edges of the cross-section.

23 Claims, 3 Drawing Sheets

METHOD FOR SELECTIVE LASER SINTERING WITH LAYERWISE CROSS-SCANNING

This application is a continuation-in-part of application Ser. No. 545,142, filed Jun. 22, 1990, which is a continuation of application Ser. No. 105,316, filed Oct. 5, 1987, which is a continuation-in-part of application Ser. NO. 920,580, filed Oct.17, 1986, now U.S. Pat. No. 4,863,538, issued Sep. 5, 1989.

This invention is in the field of selective laser sintering, and is more specifically directed to the method of scanning the laser therein.

BACKGROUND OF THE INVENTION

Selective laser sintering is a relatively new method for producing parts and other freeform solid articles in a layer-by-layer fashion. This method forms such articles by the mechanism of sintering, which refers to an process by which particulates are made to form a solid mass through the application of external energy. According to selective laser sintering, the external energy is focused and controlled by controlling the laser to sinter selected locations of a heat-fusible powder. By performing this process in layer-by-layer fashion, complex parts and freeform solid articles which cannot be fabricated easily (if at all) by subtractive methods such as machining can be quickly and accurately fabricated. Accordingly, this method is particularly beneficial in the production of prototype parts, and is particularly useful in the customized manufacture of such parts and articles in a unified manner directly from computer-aided-design (CAD) or computer-aided-manufacturing (CAM) data bases.

Selective laser sintering is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion. In this manner, the selective laser sintering method builds a part in layer-wise fashion, with flexibility, accuracy, and speed of fabrication superior to conventional machining methods.

The selective laser sintering process, and apparatus for performing the process, is described in further detail in U.S. Pat. No. 4,863,538, issued Sep. 5, 1989, U.S. Pat. No. 4,938,816, issued Jul. 3, 1990, U.S. Pat. No. 4,944,817, issued Jul. 31, 1990, and PCT Publication WO 88/02677, published Apr. 21, 1988, all of which are incorporated herein by this reference.

While the selective laser sintering process has been successful in generating accurate and three-dimensionally complex parts, certain unfavorable attributes of the process and resultant parts have been observed. Firstly, the scanning described in the above-referenced patents and publication has produced parts which are structurally weaker in one direction than another. Secondly, it has been observed that the resolution at which the parts are produced have a directional dependence, particularly at those edges of the part which are nearly parallel with the direction of scan of the laser. This is because the location at which the laser can be started and stopped (i.e., the ends of laser scan line) can be controlled to within a 0.001 inch tolerance, while the width of the laser spot size is somewhat larger, for example on the order of 0.020 inches. Thirdly, thermal warpage, or curling, has also been observed to be directionally dependent.

It is therefore an object of the invention to provide a method of selective laser sintering which can produce parts which are isotropic in construction.

It is a further object of this invention to provide such a method which has improved resolution in a manner which is directionally independent.

It is a further object of this invention to provide such a method which reduces warpage of the part being produced.

Other objects and advantages will be apparent to those of ordinary skill in the art having reference to the following specification, together with the drawings.

SUMMARY OF THE INVENTION

The invention may be incorporated into a method for selective laser sintering which changes the direction of travel of the laser beam for successive layers of the part being produced. By selectively sintering the part in different directions, the structural strength of the part being produced becomes independent of the orientation of the part. Furthermore, the resolution of the part being produced is made less directionally dependent by alternating the side of the part which is parallel to the direction of the scan. The method may include outlining of each layer prior to filling with a fill pattern, for example a parallel line fill pattern. Such outlining further improves the resolution of the part, and reduces the effects of curling at the edges of each layer.

DETAILED DESCRIPTION OF THE PREFERRED EMBODIMENTS

Figure 1:
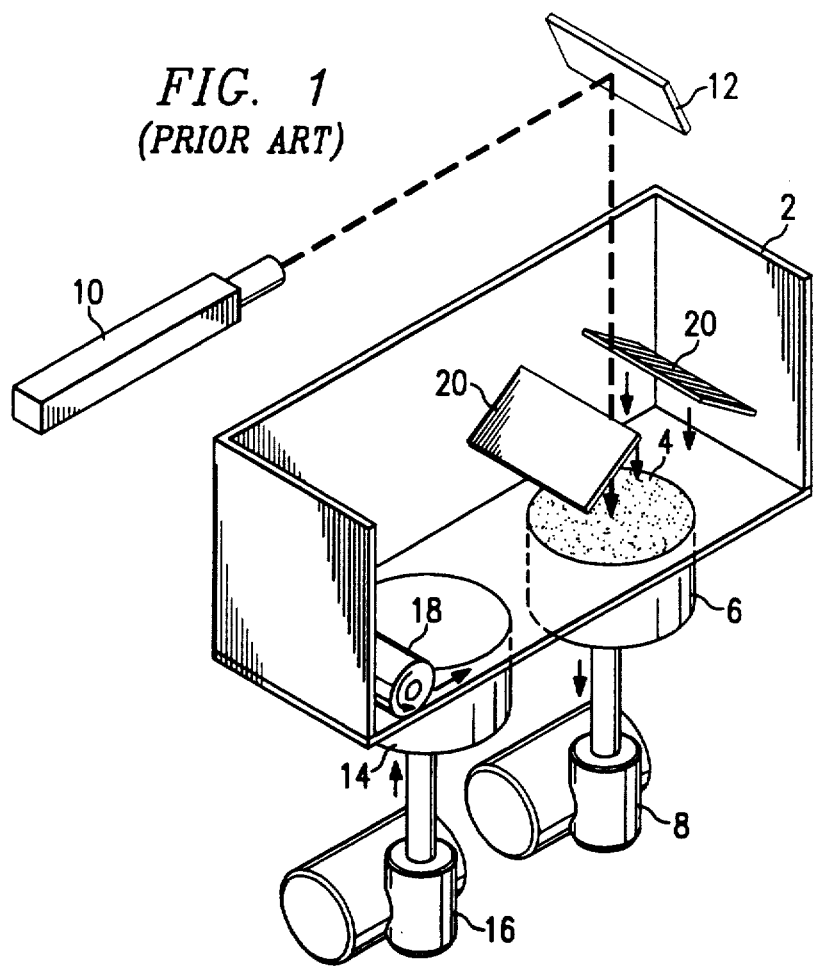
FIG. 1 is an isometric and schematic view of an apparatus for selective laser sintering.

Referring to FIG. 1, an apparatus for performing selective laser sintering will now be described. The apparatus shown in FIG. 1 is a schematic representation of the SLS Model 125 DeskTop Manufacturing system manufactured and sold by DTM Corporation. The apparatus of FIG. 1 includes a chamber 2 (front doors and the top of chamber 2 are not shown in FIG. 1, for purposes of clarity), within which the selective sintering process takes place. Target surface 4, for purposes of the description herein, refers to the top surface of heat-fusible powder (including portions previously sintered, if present) disposed on part piston 6. The vertical motion of part piston 6 is controlled by motor 8. Laser 10 provides a beam which is reflected by galvanometer-controlled mirrors 12 (only one of which is shown in FIG. 1 for clarity), in the manner described in the U.S. patents referred to hereinabove. An example of a suitable laser 10 for use in selective laser sintering is a conventional $CO_2$ laser, producing coherent light at a wavelength of 10.6 $\mu$m and a spot size of 0.020 inches, and delivering power in the range of from 5 to 25 Watts. Powder piston 14 is also provided in this apparatus, controlled by motor 16. As described in the above-referenced PCT Publication 88/02677, counter-rotating roller 18 is provided to transfer the powder to the target surface 4 in a uniform and level fashion.

In operation, the apparatus of FIG. 1 supplies powder to chamber 2 via powder cylinder 14; powder is placed into chamber 2 by the upward partial motion of powder cylinder 14 provided by motor 16. Roller 18 (preferably provided with a scraper to prevent buildup, said scraper not shown in FIG. 1 for clarity) spreads the powder within the chamber by translation from powder cylinder 14 toward and across target surface 4 at the surface of the powder on top of part piston 6, in the manner described in said PCT Publication 88/02677. At the time that roller 18 is providing powder from powder piston 14, target surface 4 (whether a prior layer is disposed thereat or not) is preferably below the floor of chamber 2 by a small amount, for example 5 mils, to define the thickness of the powder layer to be processed. It is preferable, for smooth and thorough distribution of the powder, that the amount of powder provided by powder cylinder 14 be greater than that which can be accepted by part cylinder 6, so that some excess powder will result from the motion of roller 18 across target surface 4; this may be accomplished by the upward motion of powder piston 14 by a greater amount than the distance below the floor of chamber 2 that target surface 4 is lowered (e.g., 10 mils versus 5 mils). It is also preferable to slave the counter-rotation of roller 18 to the translation of roller 18 within chamber 2, so that the ratio of rotational speed to translation speed is constant.

Further in operation, after the transfer of powder to target surface 4, and the return of roller 18 to its original position near powder piston 14, laser 10 selectively sinters portions of the powder at target surface 4 corresponding to the cross-section of the layer of the part to be produced, in the manner described in the above-referenced U.S. patents and PCT Publication. After completion of the selective sintering for the particular layer of powder, part piston 6 moves downward by an amount corresponding to the thickness of the next layer, awaiting the deposition of the next layer of powder thereupon from roller 18.

Radiant heat panels 20 are provided in the apparatus of FIG. 1, suspended from the roof of chamber 2 (in a manner not shown). Radiant heat panels 20 in this arrangement are conventional flat rectangular heat panels, each of which emit energy per unit area substantially uniformly across its surface. In this arrangement, radiant heat panels 20 are separated from one another to allow the beam from laser 10 to pass therebetween, and are disposed at an angle relative to target surface 4, to heat target surface 4 so that the surface temperature can be controlled to reduce growth and curling, as described hereinbelow. It should be noted that other configurations of radiant heaters, such as a ring-shaped radiant heater, may be used in place of radiant heat panels 20 of FIG. 1, to provide radiant heat in a more uniform manner to target surface 4.

Figure 2:
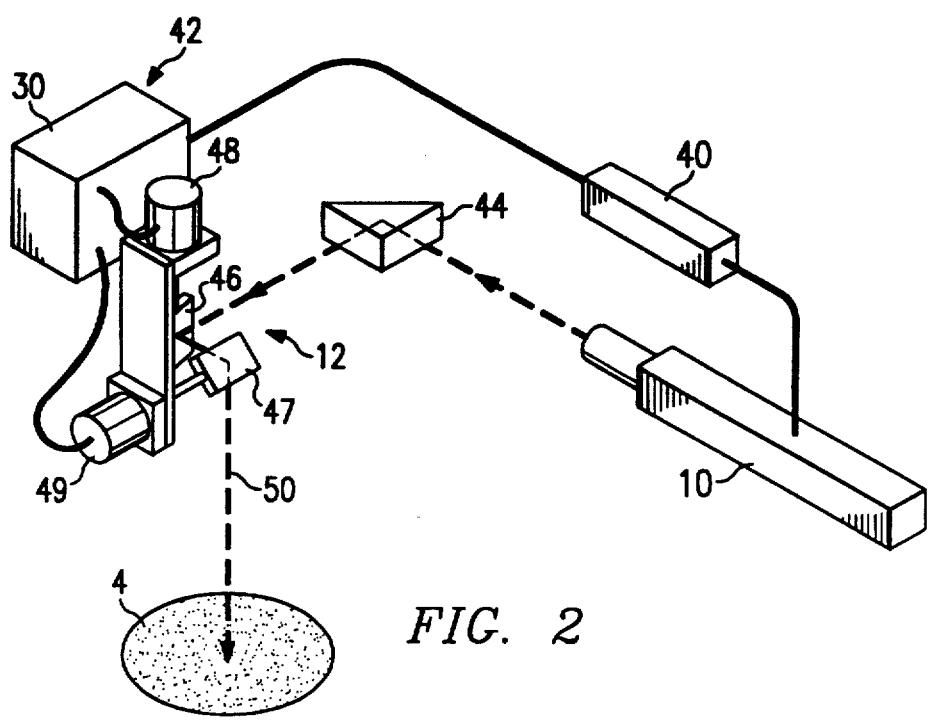
FIG. 2 is an isometric and schematic view of the portion of the apparatus of FIG. 1 which controls the direction of the laser beam to the target surface.

Referring now to FIG. 2, laser 10 and the apparatus for its control will be described in further detail, similarly as described in said U.S. Pat. No. 4,863,538. The components of the laser system are shown in FIG. 2 as integrated within laser head 10. Laser head 10 thus includes such conventional control elements as described in said U.S. Pat. No. 4,863,538, for example a safety shutter, a front mirror assembly, and focusing elements such as diverging and converging lenses. The type of laser 10 used is of course dependent upon many factors, and in particular upon the type of powder that is to be sintered. A preferred laser is a Synrad Model C48-115 $CO_2$ laser. Laser 10 is preferably controllable to be modulated on and off; while on, laser 10 produces laser beam 50 which travels generally along the path shown by the arrows in FIG. 2.

Computer 40 and scanning system 42 are also included for controlling the direction of the laser beam as it impinges target surface 4. In this preferred embodiment, computer 40 includes a microprocessor for controlling laser 10, and further includes a CAD/CAM system for generating the data by which the dimensions of the part to be produced is defined. A conventional personal computer workstation, such as a model 386-33 manufactured and sold by Austin Computer Systems, based on an 80386 microprocessor as manufactured and sold by Intel Corporation and preferably including a math coprocessor such as an 80387 math coprocessor manufactured and sold by Intel Corporation, is suitable for use as computer 40 in the preferred embodiment.

Scanning system 42 includes prism 44 for redirecting the path of travel of the laser beam; the number of prisms 44 necessary for directing the laser beam to the proper location is based on the physical layout of the apparatus. Alternatively, as is well known in the art, one or more fixed mirrors can be used in place of prism 44 for directing laser beam 50 from laser 10 to the scanning system 42, depending upon the particular layout of the equipment. Scanning system 42 further includes a pair of mirrors 46, 47 which are driven by respective galvanometers 48, 49. Galvanometers 48, 49 are coupled to their respective mirrors 46, 47 to selectively orient the mirrors 46, 47 and control the aim of laser beam 50. Galvanometers 48, 49 are mounted perpendicularly to one another so that mirrors 46, 47 are mounted nominally at a right angle relative to one another. Function generator driver 50 controls the movement of galvanometers 48 and 49, to control the aim of laser beam 50 within target surface 4, and in conjunction with its on and off modulation controlled by computer 40. Driver 50 is coupled to computer 40, so that the CAD/CAM data within computer 40 can be realized in the directional control of the laser beam via mirrors 46, 47. It is contemplated that alternative scanning systems may be used in place of scanning system 42, including such apparatus as acousto-optic scanners, rotating polygonal mirrors, and resonant mirror scanners.

Figure 3A:
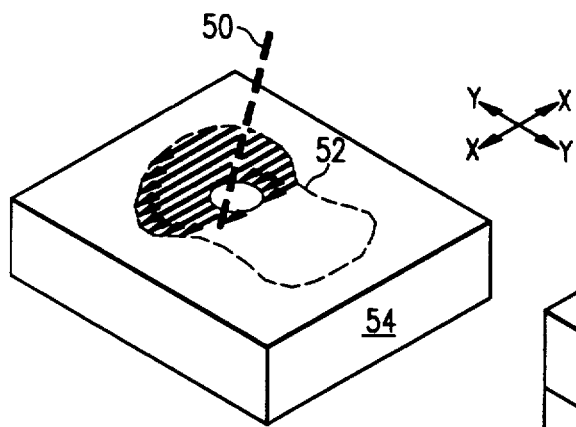
FIGS. 3a and 3b are schematic drawings illustrating the method of a preferred embodiment of the invention.
Figure 3B:
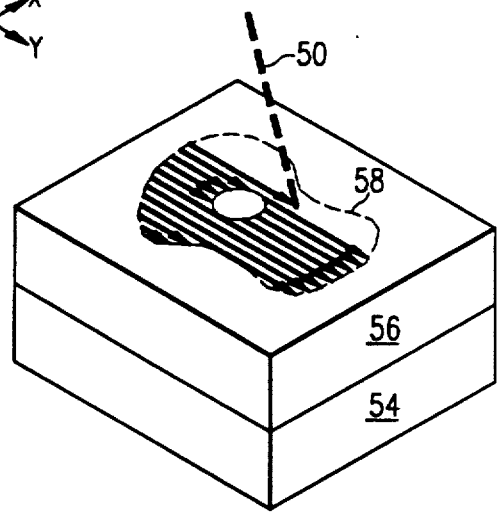

Referring now to FIGS. 3a through 3b, a method of layerwise cross-scanning according to the present invention will be described in detail. In FIG. 3a, a first layer 54 of powder is schematically shown, in which a first cross-sectional layer 52 of a part is to be produced by selective laser sintering, from energy imparted by laser beam 50. For layer 54 of FIG. 3a, cross-sectional layer 52 is defined by horizontal scanning of laser beam 50 across the surface of powder layer 54 at target surface 4.

Various types of distortion of the part being produced have been observed during selective laser sintering. A first type of such distortion includes warpage and shrinkage of the part due to thermal effects. Such warpage may manifest as the curling of a sintered layer in such a manner that it does not bond to the previously sintered layer directly therebelow; another manifestation of this warpage occurs even though the layers of the part bond together, but where the part itself warps, for example where a bottom flat surface curls up at the edges to become a curved surface, concave up. It is believed that a significant cause of this warpage is the thermal shrinkage of the sintered layer from its temperature during sintering to its post-sintering temperature, an extreme case of which causes the individual layers to not bond to one another.

Another significant problem faced by those in the field of selective laser sintering is undesired growth of the part being produced beyond the volume defined by the energy beam. As is well known, the spot size of a laser beam can be made quite small, so that according to the selective laser sintering method which defines the volume of the part by the laser scan, the resolution of the part being produced can theoretically be quite high. However, intralayer conduction of heat from the laser beam can cause particles of the powder outside the laser scan to sinter to the sintered portion. This causes the cross-sectional layer to be larger than that defined by the laser scan. In addition, growth can occur from layer to layer, for example sufficient heat from sintering remains at the time that the next layer of powder is disposed over the previously sintered portion, such that the next powder layer sinters to the prior layer without exposure to the laser beam.

It has been found that control of the temperature of the powder at target surface 4, and of the part being formed, is important in preventing both curling and growth. Where the temperature of the powder at target surface 4 is too low, curling has been observed; conversely, where the temperature of the powder is too high, growth both in the intralayer and interlayer direction has been observed. Control of this temperature may be accomplished by way of radiant heating (such as shown in FIG. 1), gas flow as described in PCT Publication WO 88/02677, or both.

Figure 5:
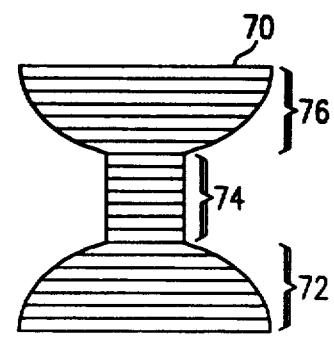
FIG. 5 is a cross-sectional illustration of a part produced by selective laser sintering which has geometry dependent curling.

It has also been observed that curling is also dependent upon the geometry of the part being fabricated. Referring to FIG. 5, a cross-sectional view of an arbitrary part 70 is shown; it should be noted that part 70 is formed layer by layer, with the layers at the bottom of part 70 in portion 72 formed first. It has been observed that curling occurs at a high degree during the formation of portion 72, since relatively little mass of part 70 has yet been formed. However, it has also been observed that curling occurs to a lesser extent during the formation of portion 74 after the formation of portion 72. This is believed to be due to the geometries of the layers being formed, as the tendency to curl is reduced for smaller layers connected to a larger previously formed mass, such as portion 74 of FIG. 5. Overhangs, such as portion 76 of part 70 in FIG. 5, have also been observed to be particularly susceptible to curling, which is believed to be due to the large area of the overhanging layers relative to the smaller area at which the layers are connected to the mass of previously formed portions 74 and 72.

Therefore, according to an embodiment of the invention, the temperature of target surface 4 during selective laser sintering may be adjusted to compensate for geometry dependent curling tendencies. For example, since curling is reduced as the temperature of the target surface 4 increases, the temperature at target surface 4 may be increased (at the risk of increased growth) during the formation of layers in portions 72 and 76. Since the risk of curling is reduced in the formation of layers in portion 74, in the formation of part 70 the temperature at target surface 4 may be reduced during the formation of portion 74; this allows for greater reduction in growth during that portion of the process. It is contemplated that the variation in target surface 4 temperature for the various portions depends upon the material of the powder, and on the geometries of the part being produced, and may be determined by relatively straightforward experimentation. The order of magnitude that such adjustment may take is contemplated to be on the order of 5 to 10 degrees Celsius for plastic and other polymer materials.

In addition, it has been observed that the laser energy per unit volume of the part being produced is also a significant factor in fabricating parts according to selective laser sintering. It has been observed that where the laser power per unit volume is too high, the phenomenon of growth occurs, primarily by thermal conduction to powder particles in the same layer which are not exposed to the laser beam. Where the laser power per unit volume is too low, however, the sintering may not be as complete as desired, resulting in parts with poorer structural integrity than desired. Furthermore, as will be described hereinbelow, it is preferable that adjacent scans sinter to one another, to provide a contiguous part cross-section; insufficient laser power will result in breaks in the sintered layer between scans, as well.

The laser power per unit area also affects the local thermal gradient at the target powder. Selective laser sintering operates by providing high thermal gradients in the target powder between the portion of the powder exposed to the beam and the portions of the powder not exposed to the beam, with the sintering temperature of the powder being between the temperature of the powder in the beam and the temperature of the powder not in the beam. The local thermal gradient in relation to the sintering temperature depends on the powder material itself, together with the laser power per unit volume.

It has been observed that, where the thermal gradient between the portion of the powder in the beam and that outside of the beam is too low, the resolution and definition of the part being produced is poor because some of the powder particles outside of the beam may sinter to the portions inside the beam (i.e., intralayer growth occurs). However, thermal gradients which are too high can also cause other problems such as, in extreme cases, ignition or decomposition of the powder or, in less severe cases, pocking of the part surface in such a manner as to resemble an orange peel. It is believed that the "orange peel" distortion results from the condition where sintering occurs at the very top surface of the target powder in the laser beam san with insufficient sintering occurring thereunder, even in the location of the laser beam scan. As a result, sintering of the target powder layer fully through its thickness, and to a sintered portion of a previous layer thereunder, may not fully occur.

Considering these factors in the performance of selective laser sintering, process ranges have been defined for certain materials which provide successfully selective laser sintering. Examples of process conditions for various materials are set forth hereinbelow in Table I.

TABLE I

| Material | Wax | PVC | Polycarbonate |
|---|---|---|---|
| Feed temp. (°C.) | 20 ± 5 | 70 ± 10 | 90 ± 10 |
| Part temp. (°C.) | 30 ± 5 | 100 ± 10 | 140 ± 10 |

The feed temperature specified in Table I corresponds to the temperature of the powder as it is being transferred to and deposited at target surface 4. The part temperature specified in Table I is the temperature of the powder bed above part piston 6. The previously sintered portions of the part being produced, located between target surface 4 and the top of part piston 6 (referring to FIG. 1) may be somewhat hotter. For each of the examples in Table I, the laser power is on the order of 10 to 15 Watts, preferably 11 to 12 Watts, scanning at a speed of on the order of 40 inches per second. The laser spot size for each material is preferably on the order of 0.020 to 0.030 inches. The distance between scans, centerline to centerline, is on the order of 0.010 to 0.020 inches, so that the laser scans overlap one another.

Referring back to FIG. 3a, it should be noted that scanning such as the horizontal scanning shown in FIG. 3a, indicated by the solid lines in FIG. 3a, may be performed by scanning laser beam 50 in a fill pattern. The preferred fill pattern is a pattern of parallel scan lines, similar to raster scanning in a cathode ray tube. The scanning of laser beam 50 across the target surface is controlled by computer 40 (see FIG. 2) so that laser 10 is modulated on and off according to whether or not the target location is within or outside of the cross-sectional layer 52 of the part to be produced; the decision of whether or not the particular location is or is not within cross-sectional layer 52 may be made by computer 40 according to the CAD/CAM or other data base stored and operated upon therein. The fill pattern scanned by laser beam 50 at powder layer 54 continues until cross-sectional layer 52 of the eventual part is fully defined.

It should be noted that it is preferable that adjacent scans of laser beam 50 on powder 54 be sufficiently close together that the particles of powder layer 54 in adjacent scans sinter together, resulting in a contiguous cross-sectional layer 52 of a part after the selective laser sintering of layer 54 is complete. This scan-to-scan sintering may be accomplished by intralayer thermal conduction, where the heat from the scan being sintered conducts laterally so as to sinter the scan being sintered to the sintered portions of prior scans. Alternatively, as noted hereinabove relative to Table I, the spot size of laser beam 50 may be of such size that the scans overlap one another, ensuring that the sintered portions of the powder in layer 54 are sintered to one another. As a result of the scan, the cross-sectional part layer 52 is formed.

It has been observed that the resolution of the edges of part cross-section 52 depends upon the direction of the raster scan. As noted hereinabove, the spot size of laser beam 50 is on the order of 0.020 inches, but the locations at which laser beam 50 starts and stops during a scan can be controlled to a tolerance on the order of 0.001 inches. Accordingly, in the example of FIG. 3a, the resolution of part cross-section 52 can be quite fine in the x-direction, relative to the resolution in the y-direction which depends upon the laser spot size. Similarly as in the case of graphic computer display, edges of part cross-section 52 which are very close to parallel with the direction of scan may have rather jagged edges. Accordingly, the resolution of part cross-section section 52 of FIG. 3a is better in the x-direction than in the y-direction.

As described in the above-cited patents and publication, after the sintering of the desired part cross-section in a first layer, another layer of powder is placed over the first layer, and the next part cross-section sintered thereinto. The sintering of the next layer is preferably performed in such a manner that the sintered portions of successive layers sinter to one another, resulting in a three-dimensional part upon completion of the sintering of a number of layers.

Referring to FIG. 3b, the next step in the selective laser sintering according to the invention will be described. A second powder layer 56 is disposed over layer 54, as described hereinabove, for example by using the powder piston 14 and roller 18 described hereinabove relative to FIG. 1. A part cross-section 58 is to be formed in layer 56; cross-section 58 will likely be slightly (or significantly, as the case may be) different in shape from part cross-section 52, to the extent that the shape of the part to be produced changes in the third dimension (i.e., the z-direction). According to this embodiment of the invention, however, the orientation of the scanning of laser beam 50 is 90° off from that of FIG. 3a, so that scanning control system 42 scans laser beam 50 in the y-direction for layer 56, rather than the x-direction as it scanned in layer 54. Scanning of part cross-section 58 in layer 56, performed in the y-direction, continues until the entirety of part cross-section 58 is complete.

Successive layers are similarly disposed over layer 56, and selectively sintered, with the direction of scanning according to this embodiment of the invention alternating between the x-direction and the y-direction for alternating layers. For example, the layer of powder disposed over layer 56 would be scanned in the x-direction again, similarly as the scanning of layer 54 shown in FIG. 3a. Upon completion of the part, as a result of the alternating scanning direction used for alternating layers, the resultant part has improved attributes over those produced by scanning in a single direction for all layers.

Firstly, structural direction-dependent differences may be present in a part produced by selective laser sintering in which the scan direction is constant for all layers. These differences, if of sufficient degree, would be noticeable in the structural strength and integrity of the part, particularly when formed from a plastic material such as ABS, PVC, polycarbonate or other polymers. Stress applied to such a part could cause its fracture parallel to the scan lines, and at a lower force than that required to fracture the part in a direction perpendicular to the scan lines. Since the part is only as strong as its strength in its weakest direction, such parts could be relatively weak structures.

Accordingly, a part formed according to the embodiment of the invention described hereinabove will have a structural strength improved over the strength of a part selectively sintered by laser scans all in the same direction. Furthermore, a part formed according to the embodiment of the invention described hereinabove will have its strength isotropic, i.e., not dependent on direction. Since no weaker direction exists, the overall structural strength of the part is increased over the prior part (even in the absence of a stronger direction). Such consistency in the strength of the produced part allows its manufacture without prior determination of the stresses to be applied to the part, and without requiring orientation of the part during its manufacture to be defined relative to its expected post-manufacture stresses.

Secondly, the part produced according to the embodiment described hereinabove is formed with substantially similar resolution on all sides, rather than with some sides of the part highly accurate and others less so. In addition, it should be noted that, for many plastics and other materials, the direction of scanning of the various layers can be seen from the finished part. Therefore, as a result of the layerwise cross-scanning method described hereinabove, the texture and surface of the produced part is more consistent over its surface. Furthermore, since the less accurate direction is not always in the same location, error in fabrication of the part does not become additive in particular directions, so that the part fabricated according to the invention is more accurately defined, overall.

It has also been observed that, in the manufacture of a part using selective laser sintering according to the preferred embodiment of the invention where alternating layers are scanned in different directions, curling is reduced from that observed for similar parts scanned in the same direction for all layers. It is believed that the reason for this reduction in curling is that a laser scan in a different direction from the prior scan relaxes structural stress in the previously sintered layer; scanning in the same direction for adjacent layers is believed to reinforce such stresses. As a result, the stresses in sintered layers which are believed to cause curling are reduced in a part formed by layerwise alternating scan directions as described above, and reducing the tendency to curl. Therefore, the temperature at which selective laser sintering is performed can be reduced, if desired, to reduce the effect of growth while curling is maintained at a manageable level due to the layerwise alternating of scan direction.

The above embodiment of the invention utilizes alternating scan directions which were 90° different from one another. This perpendicular alternating is preferred from the standpoint of ease of implementation, as based on the ease of using Cartesian coordinates in the CAD/CAM systems, and in programming computer 40 to modulate laser 10 and control mirrors 46, 47 accordingly. Such alternating of the scanning may be accomplished in such a system merely by exchange of the x and y variables in the scanning program, where the Cartesian coordinates are used.

Figure 6:
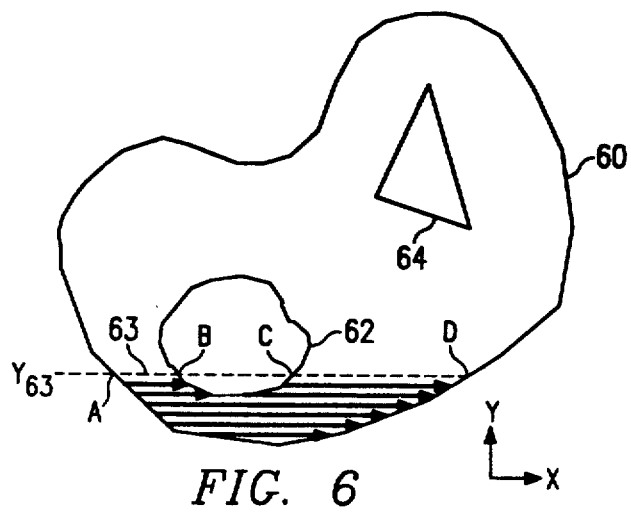
FIG. 6 is a plan view of a cross-section of a part to be produced by the preferred embodiment of the invention.
Figure 7:
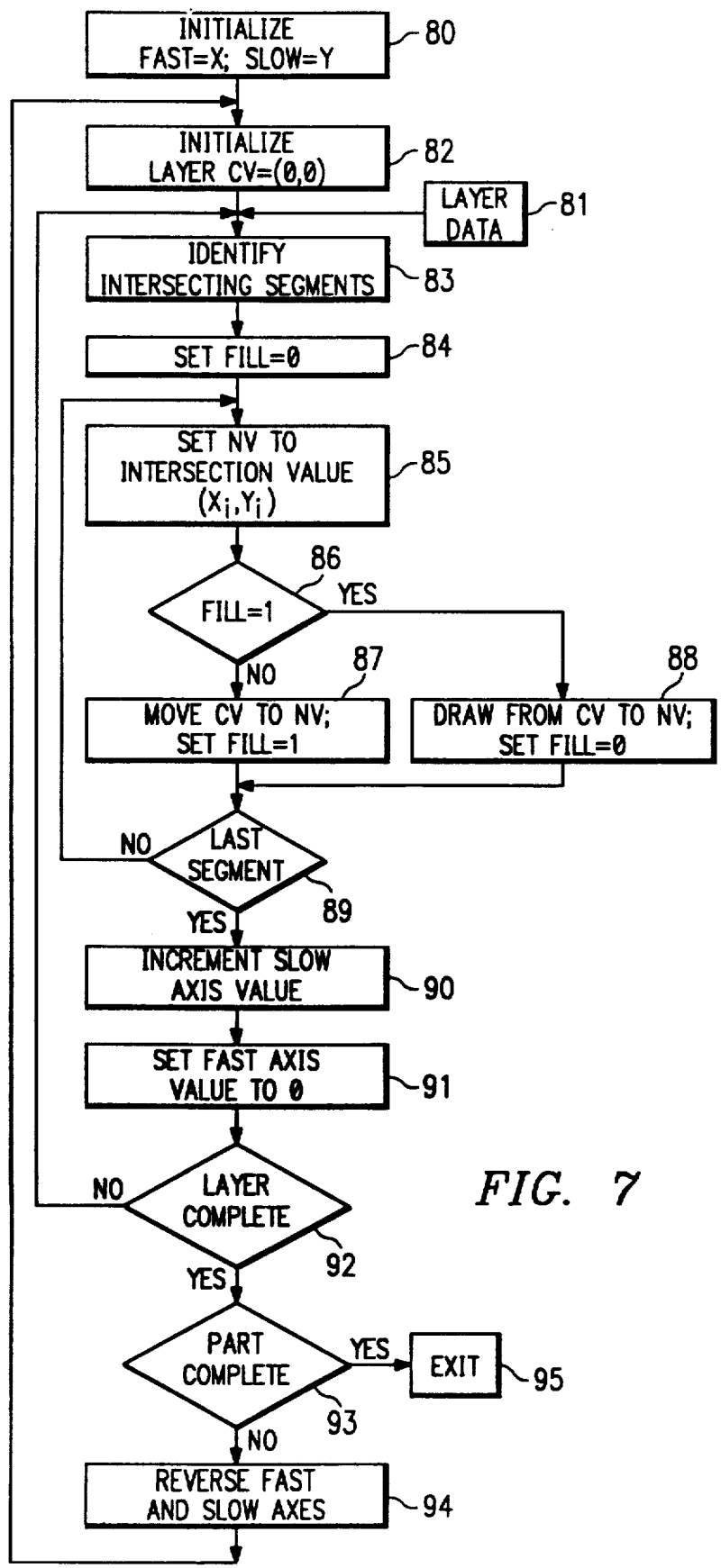
FIG. 7 is a flow chart of an algorithm for programming a computer for controlling the laser according to the preferred embodiment of the invention.

Referring now to FIGS. 6 and 7, a preferred method for operating computer 40 to alternate the scan direction in the manner described hereinabove will now be described. It is contemplated that one of ordinary skill in the art having reference to this description will be able to readily program computer 40, such as the model described hereinabove, to control laser 10 in the manner described.

FIG. 6 illustrates a cross-section of a part to be produced. Path 60 is the outer boundary of the part, and paths 62 and 64 are interior boundaries; the portion to be sintered in a layer corresponding to FIG. 6 is the portion interior of path 60 and exterior of paths 62 and 64. According to this preferred embodiment of the invention, paths 60, 62 and 64 are represented in piecewise linear fashion, as contiguous line segments. FIG. 6 illustrates paths 60, 62 and 64 in exaggerated fashion for purposes of clarity; in reality, the length of each of the segments in curved paths 60 and 62 would likely be much shorter so that the desired curved shape is more closely approximated. Of course, a shape with linear boundaries such as path 64 can readily be represented in piecewise linear fashion. Each of the segments which make up paths 60, 62 and 64 are stored in the memory of computer 40 according to their Cartesian coordinates, in this preferred embodiment of the invention.

Referring now to FIG. 7, a flow chart of the preferred computer algorithm by which computer 40 controls the scan will now be described. The method begins with the initialization of process 80, in which the fast and slow axes of scanning are defined for a particular layer of the part. In this example, the fast scan axis (i.e., the direction of scanning of laser beam 50) is initialized to the x-axis, and the slow scan axis is initialized to the y-axis. This designation of which axis is slow and which is fast is preferably done by setting flags associated with the axes, based upon which incrementing of the values (as will be described hereinbelow) will be done or not done. For example, a fill flag associated with the x-axis is set to 1 in process 80, indicating that the x-axis is the fast scan axis; conversely, the fill flag associated with the y-axis is set to 0 in process 80. Process 82 initializes the origin from which scanning will take place by setting current value CV to the origin of target surface 4, i.e., the value (0,0). Current value CV corresponds to the x-y coordinate of target surface 4 at which laser beam 50 is aimed.

The data corresponding to the segment representations of the cross-section of the part for a given layer is then retrieved, in process 81. In process 83, the line segments in the paths representing the cross-section which intersect the scan for the current slow axis value, are then identified, and the locations at which the intersections occur are stored in a table. For the example of FIG. 6, a scan 63 is to be drawn in the x-direction for a slow axis y value $y_{63}$. In this example, the points of intersection of scan 63 for the y value $y_{63}$ are illustrated as points A, B, C, and D. After identification and tabulation of the intersecting values, a counter FILL is set to 0 in process 84.

The portion of the algorithm that controls the modulation of laser 10 to sinter the desired portions of the layer will next be explained. Process 85 sets a next value NV to the next point of intersection in the table; for the drawing of scan 63, beginning from x=0, the next point of intersection is point A. Decision block 86 examines the value in counter FILL to determine if the laser is to be turned on (draw) or not (move).

According to this example, for the portion of scan 63 between x=0 and point A, since process 64 initialized FILL to the value 0, process 87 is performed. In process 87, the argument of current value CV associated with the fast scan axis (i.e., the axis for which the fill flag is set), is incremented until it reaches next value NV, which corresponds to the next point of intersection with a line segment; the other argument of current value CV remains constant. Since current value CV corresponds to the location of target surface 4 at which laser beam 50 is aimed, the aim of laser beam 50 is moved to the point of the intersection. In the example of scan 63 in FIG. 6, the value 0 for FILL corresponds to the portion of scan 63 from x=0 to point A, outside of the cross-section of path 60 and of the part to be produced. Process 87 thus merely moves the aim of laser beam 50 with laser 10 off so that no sintering occurs.

Referring still to FIG. 6, it is apparent that the motion of the aim of laser beam 50 can be performed between intersection points with laser 10 alternating between being on and being off. For example, the aim of laser beam 50 is moved from x=0 to point A along scan 63 with laser 10 off; the aim of laser beam 50 is moved from point A to point B along scan 63 with laser 10 on, and so on for the length of scan 63. Accordingly, after the move of process 87, counter FILL is set to 1 for the next portion of the scan. Process 89 determines whether or not the last intersecting segment has been used. For the example where current value CV is set to point A, the result is NO, and control returns to process 85 where the next intersection value (point B) is loaded into next value NV.

For this example, since FILL is now set to 1, the result of decision 86 transfers control to process 88. Current value CV is incremented along the fast x-axis until it reaches next value NV which is point B. During this incrementing and corresponding moving of the aimed location of laser beam 50, since FILL is set to 1, laser 10 is turned on. Referring to FIG. 6, process 88 will thus scan the portion of scan 63 of FIG. 6 between locations A and B with laser 10 on, causing selective sintering of the powder at target surface 4 therealong. Once point B has been reached, counter FILL is reset to 0 (since the next portion of scan 63 is to be done with laser 10 off), and the process continues via decision 89 and process 85.

The scanning loop of process 85 through decision 89 is continued until drawing to the last intersecting segment has been performed (with the cross-section of the part totally within the scan range, unsintered powder remains outside of the perimeter of the cross-section). Process 90 increments the value of the slow axis argument in current value CV; for the example of scan 63 of FIG. 6, the y argument of current value CV is incremented to a value $y_{63} + \Delta y$. Process 91 resets the fast axis argument to the value 0, to begin the next scan. Decision 92 then tests the value of the slow axis argument to determine if the layer to be scanned is complete; if not, control returns to process 83, for which the segments which intersect the potential scan at the new slow axis value are identified and tabulated as before.

In the event that the layer is complete, decision 93 is next performed to determine if the last layer has been sintered; if so, the algorithm exits at process 95. However, if an additional layer is to be sintered, process 94 changes the direction of scan. This is done by reversing the designation of which axis is the fast scan axis and which is the slow scan axis. A preferred method for such reversing is to set the fill flag which is currently at the 0 value and to reset the fill flag which is currently at the 1 value. Accordingly, during the scanning loop of processes 85, 87 and 88, the incrementing of current value CV to next value NV is performed for the opposite argument in successive layers. Therefore, successive layers are sintered with scan directions in alternating, perpendicular, directions according to the method of FIG. 7.

An alternative to the perpendicular alternating scanning described hereinabove is to change the scan direction from layer to layer by an angle different than 90°. Such different angles may provide still further strength in the part, and also varying effects in its manufacture. For example, use of a small angle of rotation, such as 10°, from layer to layer may be used to provide multiple different scan directions. It is believed that such additional angles of scan direction will result in further isotropy in the strength and other parameters of the part being produced by selective laser sintering. In addition, a larger angle of rotation of the scan direction, such as 60°, may provide additional strength, and perhaps avoid a torsional weakness that could be present for a part produced by a smaller angle of scan direction rotation. It should be noted that the program of computer 40 necessary to provide such rotation would probably operate more efficiently and easier in a polar, rather than Cartesian, coordinate system; it is contemplated that one of ordinary skill in the art would be able to so program computer 40 to accomplish such rotation.

Figure 4A:
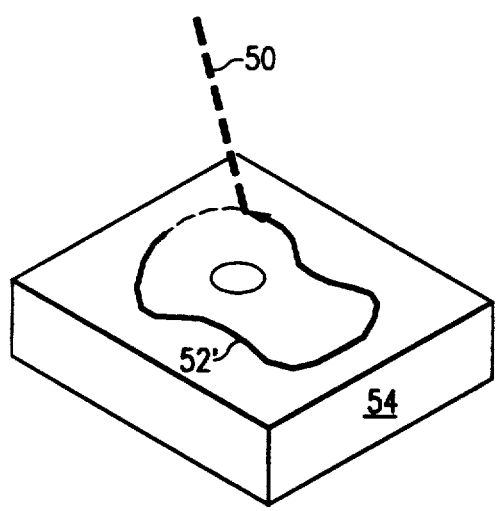
FIGS. 4a and 4b are schematic drawings illustrating an alternative embodiment of the invention.
Figure 4B:
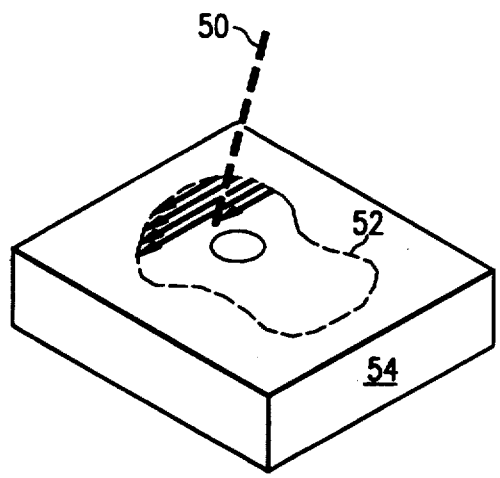

It was noted in the above-reference U.S. Pat. No. 4,863,538 that selective sintering of the powder layer may be accomplished by controlling the laser beam 50 in a vector mode, where the laser beam traces the outline of the part cross-section. Referring to FIGS. 4a and 4b, an alternative embodiment of the invention will be described which incorporates such outlining. In FIG. 4a, part cross-section 52' in powder layer 54' is first selectively sintered by laser beam 50 at its outline. After outlining by laser beam 50, the interior of the outlined part cross-section 52' is scanned, for example in the x-direction as shown in FIG. 4b. According to this alternative embodiment of the invention, successive layers, such as layer 56 of FIG. 3b, are subsequently deposited over layer 54', and scanned in similar manner as layer 54 of FIGS. 4a and 4b, first by outlining of the part cross-section thereat followed by scanning of the interior of the part. In order to take advantage of the benefits of isotropy discussed hereinabove, the scanning of the interior of the part cross-section of the next successive powder layer is done in a direction different from the x-direction scan of FIG. 4b, for example scanning in the y-direction as shown in FIG. 3b.

It should be noted that the scanning of the part cross-section in a particular layer may alternatively be performed prior to the outlining described hereinabove. It is believed, however, that the texture and resolution control of the selective laser sintering process is improved where the outlining occurs prior to the scanning step.

It has been observed that outlining of the part cross-section as shown in FIG. 4a is beneficial in improving the resolution, definition, and smoothing of the texture of each part cross-section. Firstly, outlining improves the resolution at all edges of the part cross-section to the accuracy at which laser beam 50 can be controlled, regardless of the direction of scanning of the interior of the part cross-section. Secondly, the sintering which occurs at the part cross-section edge when outlined as shown in FIG. 4a provides a defined edge of the sintered cross-section, so that discontinuities of the part at the locations where the laser is turned on or off do not appear at the edge of the part being produced, which tends to generate a rough surface for the part.

As a result of the layerwise cross-scanning performed in the selective laser sintering process, parts may be produced which incorporate the benefits of selective laser sintering, and which have improved structural integrity, and improved accuracy to the design dimensions.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of producing parts, comprising:
   disposing a first layer of heat-fusible powder at a target surface;
   scanning a selected portion of said first layer with an energy beam in such a manner as to fuse the powder thereat, said scanning of said first layer being done in a first direction;
   disposing a second layer of said powder over said first layer after said scanning step; and
   scanning a selected portion of said second layer with said energy beam in such a manner as to fuse the powder thereat, said scanning of said second layer being done in a second direction.

2. The method of claim 1, wherein said step of scanning a selected portion of said second layer is also done in such a manner as to fuse the powder in said second layer to a fused portion of said first layer.

3. The method of claim 1, wherein said energy beam is a laser beam.

4. The method of claim 1, wherein said second direction is perpendicular to said first direction.

5. The method of claim 4, further comprising:
   disposing a third layer of powder over said second layer of powder after said step of scanning a selected portion of said second layer; and
   scanning a selected portion of said third layer with an energy beam in such a manner as to fuse the powder thereat, said scanning of said third layer being done in said first direction.

6. The method of claim 1, further comprising:
   disposing a third layer of powder over said second layer of powder after said step of scanning a selected portion of said second layer; and
   scanning a selected portion of said third layer with an energy beam in such a manner as to fuse the powder thereat, said scanning of said third layer being done in said first direction.

7. The method of claim 1, further comprising:
   after said step of disposing said first layer of powder, tracing the outline of a first cross-section of a part with said energy beam in said first layer in such a manner as to fuse the powder thereat.

8. The method of claim 7, wherein said step of scanning a selected portion of said first layer is performed after said tracing step.

9. The method of claim 1, wherein said scanning steps sinter the selected portions of said first and second layers.

10. A part produced by a method comprising the steps of:
    disposing a first layer of heat-fusible powder at a target surface;
    scanning a selected portion of said first layer with an energy beam in such a manner as to fuse the powder thereat, said scanning of said first layer being done in a first direction;
    disposing a second layer of said powder over said first layer after said scanning step; and
    scanning a selected portion of said second layer with said energy beam in such a manner as to fuse the powder thereat, said scanning of said second layer being done in a second direction.

11. The part of claim 10, wherein said step of scanning a selected portion of said second layer is also done in such a manner as to fuse the powder in said second layer to a fused portion of said first layer.

12. The part of claim 10, wherein said energy beam is a laser beam.

13. The part of claim 10, wherein said second direction is perpendicular to said first direction.

14. The part of claim 13, wherein the method further comprises:
    disposing a third layer of powder over said second layer of powder after said step of scanning a selected portion of said second layer; and
    scanning a selected portion of said third layer with an energy beam in such a manner as to fuse the powder thereat, said scanning of said third layer being done in said first direction.

15. The part of claim 10, wherein the method further comprises:
    disposing a third layer of powder over said second layer of powder after said step of scanning a selected portion of said second layer; and
    scanning a selected portion of said third layer with an energy beam in such a manner as to fuse the powder thereat, said scanning of said third layer being done in said first direction.

16. The part of claim 10, wherein the method further comprises:
    after said step of disposing said first layer of powder, tracing the outline of a first cross-section of a part with said energy beam in said first layer in such a manner as to fuse the powder thereat.

17. The part of claim 16, wherein said step of scanning a selected portion of said first layer is performed after said tracing step.

18. The part of claim 10 wherein said scanning steps sinter the selected portions of said first and second layers.

19. An apparatus for performing selective laser sintering, comprising:
    a target surface;
    means for disposing a layer of heat-fusible powder at said surface;
    an energy source for producing an energy beam, said energy beam having sufficient power to fuse together portions of said heat-fusible powder exposed to said energy beam; and
    means for controlling the energy beam from said energy source in such a manner as to scan, in a first direction, a first layer of said powder at said target surface, and to scan, in a second direction, a second layer of powder overlying said first layer of powder.

20. The apparatus of claim 19, wherein said energy source comprises a laser.

21. The apparatus of claim 20, wherein said controlling means comprises:
- a mirror for directing said energy beam, said mirror being tiltable responsive to an electrical signal; and
- a computer having an output connected to said mirror, for tilting the mirror according to a program stored therein, so that said energy beams scans said first layer in said first direction and said second layer in said second direction.

22. The apparatus of claim 21, wherein said controlling means further comprises:
- means for directing the energy beam between said laser and said mirror.

23. The apparatus of claim 21, wherein said stored program further controls said mirror in such a manner that said energy beam traces an outline of a cross-section of said part in said first and second layers.

* * * * *